United States Patent                                   [15]   3,656,935
Iwasaki                                                       [45]  Apr. 18, 1972

[54] PROCESS FOR RECOVERING NICKEL FROM NICKEL ORES

[72] Inventor: Iwao Iwasaki, Minneapolis, Minn.

[73] Assignee: The Regents of the University of Minnesota, Minneapolis, Minn.

[22] Filed: Apr. 24, 1970

[21] Appl. No.: 31,759

[52] U.S. Cl. ................................75/82, 75/2, 75/7, 75/31, 75/113
[51] Int. Cl. ..................................................C22b 23/02
[58] Field of Search ..................75/82, 2, 7, 113, 31, 0.5 AA

[56]  References Cited

UNITED STATES PATENTS

| | | | |
|---|---|---|---|
| 3,453,101 | 7/1969 | Takahashi et al. | 75/2 |
| 1,717,160 | 6/1929 | Kichline | 75/82 X |
| 3,323,900 | 6/1967 | Takahashi et al. | 75/2 |

FOREIGN PATENTS OR APPLICATIONS

| | | | |
|---|---|---|---|
| 1,080,210 | 8/1967 | Great Britain | 75/82 |

Primary Examiner—L. Dewayne Rutledge
Assistant Examiner—G. T. Ozaki
Attorney—Kenyon & Kenyon Reilly Carr & Chapin

[57]  ABSTRACT

This invention provides a process for the treatment of nickel ores whereby the comminuted feed ore is mixed with a halide and an oil and the mixture is maintained at a temperature and for a length of time sufficient to metallize the nickel in the ore by the migration of the nickel from its finely dispersed state in the feed ore to aggregate in the form of globules of iron-nickel alloy. This permits the subsequent recovery and concentration of the nickel by magnetic separation and by other conventional physical separation procedures. By the application of this process the nickel present in very low grade nickel ores and in ores of a complex nature may be recovered and concentrated.

9 Claims, No Drawings

PROCESS FOR RECOVERING NICKEL FROM NICKEL ORES

This invention relates to the processing and concentration of nickel ores. In particular, it relates to the metallizing of nickel in its ores, preparatory to separation and concentration of the nickel values.

It is well known to extract nickel from its ores by grinding and roasting the ore and separating the nickel from the resulting material. The prior U.S. Pat. No. 3,453,101, Yoshikazu, Takahashi et al, discloses the treatment of nickel laterite ores by the use of a halide compound and a solid reducing agent. Canadian Patent No. 618,827 to Hills discloses the use of a crude oil roasting step for the direct reduction of nickeliferous laterite ores which permits the subsequent recovery of nickel therefrom by ammoniacal leaching. In preference to the methods brought out in these prior disclosures, the present invention provides a process whereby the nickel in the ores aggregates in the form of globules of magnetic iron-nickel alloy which can be cheaply and efficiently concentrated by magnetic separation and by other conventional physical separation procedures.

The present invention therefore provides a process for the treatment of nickel ores whereby the comminuted ore is mixed with a halide and an oil and the mixture is retained in a neutral or reducing atmosphere at a temperature and for a length of time sufficient to metallize the nickel in the ore by migration and aggregation in the form of globules of magnetic iron-nickel alloy. The aggregated nickel particles may then be separated from the calcine by any of the following conventional ore dressing procedures:

a. Magnetic separation
b. Flotation
c. Gravity separation

The temperature at which the mixture of feed ore, oil and halide is maintained (the metallizing temperature) will be in the range of 800° C. to 1,100° C., and preferably at about 950° C. The mixture will normally be retained at metallizing temperature for up to 2 hours and preferably from one-half hour to 1 hour.

The reagents should be present in the mixture in amounts up to 15 percent by weight for the oil and up to 6 percent by weight for the halide and preferably from 2½ to 11 percent for the oil and from 1½ to 4 percent for the halide.

The preferred halide is a chloride. It has been found that the most effective chloride for the purpose of the present invention is sodium chloride. Unrefined sodium chloride of the type which is designated as FC salt is especially suitable.

The preferred oil is a heavy oil. A particularly useful heavy oil is the residual fuel oil of the type known as Bunker C. This is a very viscous residual fuel oil which can be obtained in most parts of the world at very low cost.

The ore feed size should preferably be in the range of −5 mesh to −60 mesh on the U.S. Standard Scale.

It is known in the art that the commercially significant nickel ores are classified into two main type; namely, sulphide ores which are primary nickel ores, and laterites and garnierite which are secondary nickel ores.

Nickel-bearing sulphide ores are normally concentrated by flotation to produce a concentrate generally containing some 5% Ni to 15% Ni. These concentrates are smelted either in a reverbatory or blast furnace to produce a nickel matte for further refining. In some cases these concentrates may be processed by leaching. Sulphide ores mined primarily for their nickel content which are being commercially treated at the present time generally contain more than 1 percent nickel, however, in some cases ores with nickel grades down to the range of 0.7 percent Ni are processed.

Nickel-bearing laterites and garnierite result from the deterioration of primary rock materials through weathering, erosion and related natural chemical and physical processes, during which the nickel values are concentrated many times compared with the primary rock materials from which they are derived. Rock materials produced by these processes and mined for their metal content are known as "secondary" ores.

Because there are no known applicable physical ore dressing techniques, laterite and garnierite ores are directly treated by blast or electric furnace smelting, the Krupp-Renn process which requires melting the ore, or by leaching with either ammonia or sulphuric acid. Nickel-bearing laterite and garnierite ores which are subject to commercial exploitation normally contain from 1.5% Ni to 5.0% Ni.

Primary rock materials (as distinguished from secondary rock materials) with very low nickel contents (i.e., below about 0.5% Ni, herein generically referred to as "very low-grade primary nickel ores") are found in various parts of the Precambrian and Cordillera regions of the United States and Canada and in other regions of the world including Northern Europe, Asia, Australia, New Zealand and various tropical and subtropical areas. In the United States, Canada and elsewhere, very low-grade primary nickel ores which are of special interest for exploitation with the invention herein described are characteristically found in the form of ultramafic rock formations containing finely dispersed nickel in the 0.2% Ni to 0.5% Ni range. These formations represent vast amounts of nickel and it is apparent that the development of a commercially feasible process to recover nickel on a large scale at low cost from these ores would make available vast new quantities of nickel. The recovery and concentration of nickel from these very large volume very low-grade primary nickel ores at low cost by the application of this invention, represents a new development in the state of the art.

The processes of the present invention are of particular interest and value since the reagents employed in accordance with the present invention are of low cost in comparison with prior art methods. While cost of the reagents is an important consideration in any nickel extraction method, it is of particular importance when the nickel ore is of a type which has a very low nickel content.

This invention may usefully be practiced on very low-grade primary nickel ores. In such ores the nickel may be present as one or more of the following: sulphides, oxides, silicates, arsenides, alloys and native metal. The nickel sulphide minerals in these very low-grade primary nickel ores are predominently millerite (NiS) and pentlandite ($(Fe,Ni)_9S_8$) but may also include one or more of the following: siegenite ($(Co, Ni)_3S_4$), violarite ($(Ni,Fe)_3S_4$), heazlewoodite ($Ni_2S$), polydymite ($Ni_3S_4$) and gersdorffite (NiAsS). Iron-nickel alloys include awaruite (58% Ni, 31% Fe) and josephinite $FeNi_3$ or $Fe_2Ni_5$). The nickel content of these ores is relatively constant, generally falling in the range of from 0.2% Ni to 0.5% Ni, a range which has heretofore been unexploitable commercially.

The mineralogical composition of typical very low-grade primary nickel ores has been determined by petrographic examination. The following examples are very low-grade primary nickel ores which are considered suitable for processing in accordance with the present invention.

(A)

| | |
|---|---|
| Serpentine plus related magnesium silicates and minor carbonates | 90–95% |
| Magnetite | 5% |
| Chromite | 1% |
| Millerite, violarite, pentlandite and other nickel sulphides | 1% |
| Awaruite and other iron-nickel alloys | trace quantities |

(B)

| | |
|---|---|
| Serpentine (largely antigorite) | 60–65% |
| Olivine | 20–25% |
| Orthopyroxene | 15% |
| Oxides (chrome spinel plus magnetite) | 1–2% |
| Nickel-iron alloys | trace to 1% |

(C)

| | |
|---|---|
| Serpentine and related magnesium silicates | 70–80% |
| Magnetite | 10–25% |
| Chromite | 2–5% |
| Millerite, violarite, pentlandite and other nickel sulphides | 0.5–3% |
| Awaruite (iron-nickel alloy) | nil to trace |

Such very low-grade primary nickel ores are frequently characterized by very low sulphur contents, by a low sulphur to nickel ratio (generally less than 1:1), and by little or no pyrrhotite in contrast with normal nickel sulphide ores in Canada and elsewhere. To indicate the low ratio of sulphur to nickel in very low-grade primary nickel ores, Table 1 sets forth the analyses of samples of such ores from three different locations.

TABLE 1

|  | Location A | | Location B | | Location C | |
| --- | --- | --- | --- | --- | --- | --- |
| % Ni | 0.30 | 0.29 | 0.25 | 0.27 | 0.24 | 0.25 |
| % S | 0.14 | 0.09 | 0.08 | 0.15 | 0.14 | 0.08 |
| S : Ni | 1:2.1 | 1:3.2 | 1:3.1 | 1:1.8 | 1:1.7 | 1:3.1 |

In accordance with one aspect of the present invention, the nickel ore is first crushed and, if necessary ground, in conventional equipment to the desired particle size. The comminuted ore is then mixed with the halide and the oil. The halide and the oil may be mixed with the ore prior to the heating of the ore or after the ore is heated to metallizing temperature, or at some intermediate stage, or both. The halide and the oil may be mixed with the ore at the same time or in separate or in combined separate and joint mixing stages.

The halide may be introduced into the mixture as small particles or in a water solution. The quantity and particle size of the halide can be varied to effect optimum recovery of nickel and concentrate grade for different types of ores.

The oil should be mixed thoroughly with the ore by any suitable means. In cases where more volatile oil is employed, it may be particularly important to add the oil during the heating of the ore to metallizing temperature or after the ore has reached such metallizing temperature so as to avoid excessive loss of volatiles before the metallizing reaction takes place.

The loss of volatiles during heating may be minimized by the use of an oil injection means within the heating apparatus. In the case where the heating unit is a rotary kiln, this should provide sufficient mixing action, although where necessary this mixing may be augmented by the use of a mixing device. The quantity and viscosity of the oil can be varied to effect optimum recovery of nickel and concentrate grade.

The mixture of ore, halide and oil is retained at metallizing temperature in a neutral or reducing atmosphere for a sufficient period of time to effect metallization and aggregation of the nickel in the ore. The metallizing temperature and retention times can be varied for different types of ores as required to optimize recovery and concentrate grade.

The suggested limits for halide and oil addition have been arbitrarily fixed on the basis of development work to date. However, these limits should not be construed restrictively since the important limitations are retention time and the cost of the reagents. It is possible to lower the amounts of halide and oil by using techniques which minimize the volatilization of these materials before and during the metallization reaction.

The material emerging from the metallizing stage can go directly to the separation step or through an intermediate grinding stage depending on the most economic procedure in relation to recovery and cost.

Although this should not be considered limiting, it is believed that the reaction of the present invention metallizes the finely dispersed nickel in the feed ore by migration of the nickel particles to aggregate in the form of globules of nickel-iron alloy around existing or newly formed nickel-iron alloy particles in the ore. Present evidence indicates that the nickel collects on itself by the phenomenon of grain growth to form the globules of nickel-iron alloy.

The reaction of the reagents in the metallizing process appears to be such that initially some of the nickel sulphides and/or iron oxides are broken down to form native nickel and/or iron-nickel alloys and/or metallic iron in small particles. These particles then act as a seeding nuclei in the phenomenon of grain growth, producing iron-nickel globules of increasing size as the remainder of the nickel, which is finely dispersed throughout the ore, migrates and aggregates as growing globules.

In the case of ores with native nickel and/or iron-nickel alloys naturally present (see ore type B preceeding), the native nickel and/or iron-nickel alloy particles already present act as the seeding nuclei for the collection of nickel.

Where ores are deficient in nickel sulphides, native nickel, iron-nickel or suitable iron, if necessary, the seeding by small particles of metallic iron, native nickel or iron-nickel alloy can be effected by adding the desired seed particles with the other reagents.

EXAMPLES 1 to 6

In the following examples laboratory scale experiments were carried out on very low-grade primary nickel ores using fuel oils of three different viscosities.

Procedure:

The very low-grade primary nickel ore was ground to −48 mesh. The ground ore was then mixed with a quantity of FC grade salt NaCl equal to 4 percent by weight of the ore and with varying amounts and types of fuel oil for each charge.

Each charge, consisting of the ore, fuel oil and NaCl was premixed in a V-mixer for 10 minutes. The charge was then placed in a 1¼ inch (I.D.) by 15¼ inch long quartz tube crucible. This was placed in a vertical tube furnace and heated to 950° C. at the rate of approximately 10° C. per minute. It was retained at this temperature (metallizing temperature) for 60 minutes.

A nitrogen atmosphere was maintained during the heating, metallizing, and cooling steps.

The resulting calcine was then ground in a laboratory rod mill for 20 minutes at 30 percent solids. Standarized magnetic separation was then performed on the ground calcines using a combination of Schultz and Davis laboratory magnetic separators.

The fuel oils used in the experiments are listed in Table 2, below.

TABLE 2

| Oil Type | Gravity | Viscosity at 100° F | Examples |
| --- | --- | --- | --- |
| No. 6 fuel Oil Bunker C | 13.3 A.P.I. | 3,840 S U (about 350 S F) | 1,2,3,4 |
| No. 4 fuel oil | 20.0 A.P.I. | 92 S U | 5 |
| No. 3 fuel oil | 23.4 A.P.I. | 35 S U | 6 |

The results of the experiments are shown in Table 3.

TABLE 3

| Example | Oil Type | Amount | Product | % Ni | % Ni Dist |
| --- | --- | --- | --- | --- | --- |
| 1 | No. 6 Fuel oil | 15 % | Conc | 15.42 | 62.84 |
|  |  |  | Mid | 0.71 | 0.91 |
|  |  |  | Tail | 0.122 | 36.25 |
| 2 | No. 6 Fuel oil | 10 % | Conc | 18.16 | 69.97 |
|  |  |  | Mid | 1.13 | 1.70 |
|  |  |  | Tail | 0.102 | 28.33 |
| 3 | No. 6 Fuel oil | 5 % | Conc | 20.96 | 52.57 |
|  |  |  | Tail | 0.167 | 47.43 |
| 4 | No. 6 Fuel oil | 2½ % | Conc | 26.79 | 33.97 |
|  |  |  | Mid | 7.03 | 4.44 |
|  |  |  | Tail | 0.195 | 61.59 |
| 5 | No. 4 Fuel oil | 10 % | Conc | 18.91 | 54.67 |
|  |  |  | Tail | 0.167 | 45.33 |
| 6 | No. 3 Fuel oil | 10 % | Conc | 17.34 | 23.15 |
|  |  |  |  | 0.26 | 76.85 |

The following is a general analysis of the concentrate produced in Example No. 2:
Chemical analysis:

Nickel                18.16%

Spectrographic and X-ray analysis:

|  | Quantitative | Semi-quantitative |
|---|---|---|
| Total Iron | 59.2% |  |
| Metallic Iron | 47.1% |  |
| *Sulphur | 3.6% |  |
| Manganese |  | 0.1% |
| Magnesium |  | 3% |
| Chromium |  | 1% |
| Silicon |  | 3% |
| Calcium |  | 1% |
| Cobalt |  | 0.5% |
| Aluminum |  | 0.2% |

Compounds Identified
1. Alpha Iron
2. Iron Oxide ($Fe_2O_3$)
3. Nickel-Iron Alloy ($Ni_3Fe$)

*The sulphur in the concentrate is probably derived in large part from the sulphur content of the fuel oil.

The value given for metallic iron in the foregoing general analysis of concentrate includes the metallic iron present in the nickel-iron alloy.

DISCUSSION OF RESULTS

The results of Example Nos. 1 to 4 show an increased grade of nickel in the concentrate and an increased recovery as the amount of oil is reduced from 15 to 10 percent. Further reduction in the amount of oil shows a further increase in the grade of nickel in the concentrate but with an accompanying decrease in recoveries. By varying the amount of oil in the mixture it is possible to achieve a specific recovery and concentrate ratio. It appears that excessive amounts of oil are detrimental to both recovery and grade of concentrate.

Example Nos. 2, 5, and 6 show a higher recovery with a comparable grade of nickel in the concentrate for high viscosity oil as compared to lower viscosity oil. By utilizing very high viscosity oils (up to SF 500 and higher), a higher nickel recovery can be projected without decreasing the grade of nickel in the concentrate.

Oils of low sulphur content may be utilized in the process where a low sulphur content is desireable in the concentrate.

The concentrate produced may be used as a direct feed in the steel making process or it may be up-graded and refined by presently practiced procedures such as smelting, leaching and electrolysis.

I claim:

1. In a process for recovering a nickel concentrate from a comminuted primary rock material containing iron and up to about 0.5 percent nickel, the method of converting the nickel to a form susceptible to recovery and concentration by conventional ore dressing techniques, comprising the steps of heating the comminuted primary rock ore at a temperature of from 800° C. to 1,100° C. in the presence of 1 to 6 percent (by weight based on the ore) of a compound chosen from the group consisting of halides of an alkali metal and halides of an alkaline earth metal, and 1 to 15 percent (by weight based on the ore) of a petroleum oil, for a length of time sufficient to metallize and concentrate the nickel as an aggregation of discrete globules of ferro-nickel alloy.

2. The process according to claim 1 wherein the primary ore material is characterized by a sulphur to nickel ratio of less than 1.

3. The process according to claim 1 wherein the amount of petroleum oil present is between about 2½ percent and 11 percent (by weight based on the ore).

4. The process according to claim 1 wherein the halide compound is present in the amount of between about 1½ to 4 percent (by weight based on the ore).

5. A process for the treatment of nickel ores as in claim 1 for the recovery and concentration of nickel from ores in which the nickel is present in one or more of the following forms: nickel sulphides, nickel oxides, nickel silicates, nickel arsenides, nickel alloys, and native nickel.

6. A process as in claim 1 wherein the halide is a chloride.

7. A process as in claim 6 wherein the chloride is sodium chloride (NaCl).

8. A process as in claim 1 wherein the oil is a heavy fuel oil.

9. A process as in claim 8 wherein the heavy fuel oil is Bunker C fuel oil.

* * * * *